Figure 1:
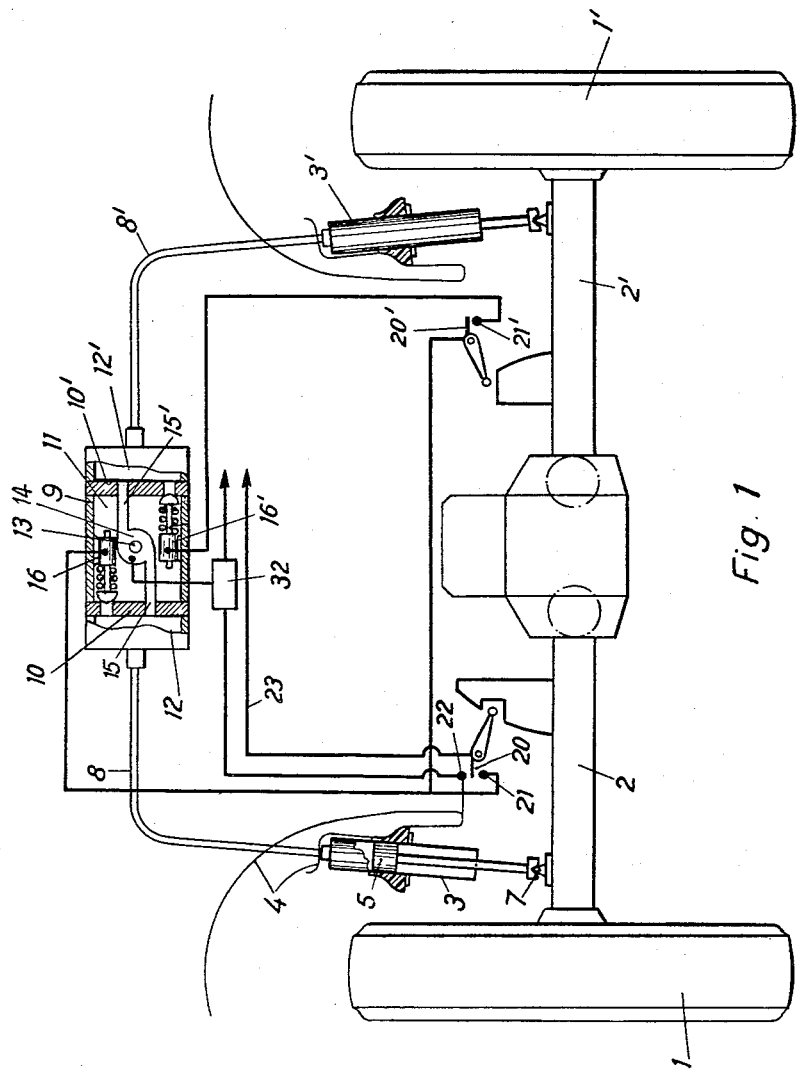

United States Patent Office 3,122,379
Patented Feb. 25, 1964

3,122,379
TRIM-CORRECTOR DEVICE FOR A VEHICLE
Fernand Stanislas Allinquant, 6–10 Rue Olier,
Paris, France
Filed Dec. 12, 1961, Ser. No. 158,740
Claims priority, application France Dec. 23, 1960
6 Claims. (Cl. 280—6.1)

In order to vary the carrying force of the suspension of a vehicle having elements comprising a fluid under pressure, adapted to regulate, in a suspension system of this kind, the height of the suspended masses relatively to the non-suspended masses, it has already been proposed to inject or withdraw fluid at an appropriate point on the suspension elements.

Thus, trim-corrector devices have been proposed, wherein in particular the fluid is transferred in one direction from a chamber of variable volume of the suspension element to a chamber of fixed volume, by means of a compressor driven by an electric motor and in the other direction by means of an electro-valve.

The present invention relates to an electric arrangement permitting the energization of the electric motor or the electro-valve depending on the position of the chassis relatively to pre-determined levels, with the view to restoring the chassis into a correct median position.

According to the invention, the trim-corrector device comprises a level detector having contacts setting up a circuit starting from a device capable of supplying electric impulses and ending either at the coil of a relay forming a feed circuit for the electric motor or at the winding of the electro-valve and at the coil of its relay connected across the terminals of the said winding, and closing a feed circuit for the said winding, means being provided for permitting the re-feeding of the coils of the relays through the intermediary of the level-detector, in such manner that the relays continue to feed the motor or the electro-valve after the passage of the impulse and for as long as the corresponding contacts are closed by the level-detector. Thus, the impulse closes the relay associated with the motor or with the electro-valve depending on the position of the chassis relatively to pre-determined levels, and the relay circuit-breaker remains closed for as long as the level of the chassis is incorrect.

Preferably, the impulse is set up by a device the contact of which is disengaged by the accelerator pedal of the vehicle at the end of its travel and re-engaged by the return of the same pedal at the end of travel.

Otherwise, the interruption of the feed of the electro-valve winding can be effected by breaking the contacts of the level detector and the re-feeding of the coil of the relay associated with the electro-valve may be effected by means of the conductor connecting the said detector to the said winding.

On the other hand, in view of the stronger intensities involved in the operation of the electric motor, it is preferable that the interruption of the feed of the motor should be effected by the relay associated with the said motor and not by the contact of the level detector. The re-feeding of the relay coil is effected by a connecting means between the electric motor and the level detector, which permits the passage of current only in the direction from the motor to the detector.

Figure 2:
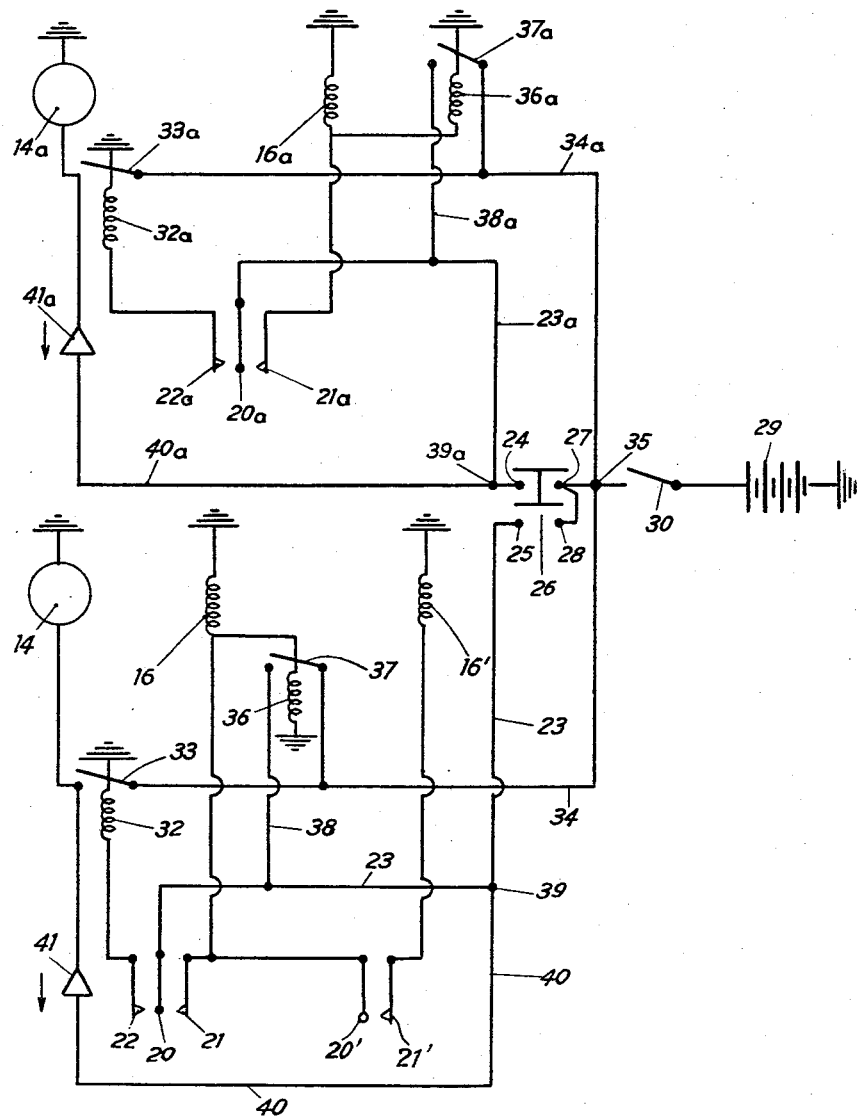

Further features of the invention will be disclosed during the description which follows, given with reference to the accompanying drawings, which are provided by the way of non-limitative example and wherein:

FIG. 1 is a diagram, with partial section, of a trim-correcting device associated with the suspension elements of the rear set of wheels of a vehicle; and FIG. 2 is a diagram of an electric circuit according to the invention.

FIGURE 1 shows, extremely diagrammatically, the rear set of wheels of a motor vehicle, the rear left-hand wheel 1 being carried on a half-axle 2 and the rear right-hand wheel 1' by a half-axle 2'.

Throughout the ensuing description the element on the right of the vehicle corresponding to any element on the left will be indicated by the same reference numeral with a prime and the element associated with the front axle corresponding to any element associated with the rear axle will be indicated by the same reference numeral followed by an $a$.

Associated with each of the half-axles, for example that of the rear-left-hand wheel, is a suspension element comprising a cylinder 3 integral with the chassis or with the body 4 of the vehicle and in which slides a piston 5 the rod of which is articulated at 7 on the corresponding half-axle. The cylinder contains oil serving as a means for damping the displacement of the piston and, above the said oil, as gas under pressure such as compressed air serving as a resilient suspension element. The upper part of the cylinder containing compressed air is connected by a tube 8 to a housing 9 into which opens out also the tube 8' connected to the upper part of the cylinder 3' of the suspension element associated with the right-hand rear wheel.

Two transverse partitions 10 and 10' divide up the interior of the housing 9 into three compartments, a central space 11, and two lateral chambers 12 and 12' into which open the tubes 8 and 8' and each of which completes the volume of the space required by the compressed air in the cylinder of the corresponding suspension element.

In the space 11, a compressor 13 driven by an electric motor 14, sucks through conduits 15 and 15' fluid contained in the lateral chambers 12 and 12' and supplies this compressed fluid to the interior of the chamber 11. Electro-valves 16 and 16' control passages formed in the partitions 10 and 10' and establish communication between the central chamber 11 and the chambers 12 and 12' respectively. On each of these electro-valves, a spring constantly urges the valve needle in such manner as to normally close communication between the central chamber and the lateral chambers.

Thus, the compressor associated with the rear suspension element permits the tapping of compressed air from the cylinders of the said elements for lowering the vehicle, whereas the electro-valves, each of which is associated with a suspension element, permit the introduction of compressed fluid into the cylinders of the said elements for raising the chassis relatively to the wheels.

Furthermore, there is provided at the front of the vehicle, in a substantially analogous arrangement (not shown entirely in FIG. 2) a casing containing a compressor driven by a motor 14a for withdrawing compressed air from the forward suspension elements. On the contrary, it is possible to use only a single electro-valve 16a for re-introducing compressed fluid into the two suspension elements simultaneously.

The position of the chassis relatively to the front axle is revealed by a front level-detector comprising a movable contact 20a and fixed contacts 21a and 22a. The movable contact is driven by a feeler associated with the chassis and co-operating with an axle member in such manner as to contact the fixed contact 21a when the height of the vehicle is less than a certain value and to contact the fixed contact 22a when the height of the vehicle is greater than a certain value. In the vicinity of the median position, there is a neutral zone in which no contact is established.

The movable contact 20a is connected by a conductor 23a to one of the terminals of the output 24 of an impulse contact 26 the corresponding input terminal of which is connected to a source of current 29, connected to earth. The said source of current may consist of the accumulator battery of the vehicle or of an auxiliary battery. A switch 30 is interposed between the impulse contact and the source of current.

The fixed contact 21a is connected to the winding of the front electro-valve 16a. The fixed contact 22a is connected to the coil 32a of a relay which actuates a switch 33a, which is normally open. This switch is disposed on a conductor 34a connecting the front motor 14a of the compressor to a point 35 between the impulse contact 26 and the general circuit-breaker 30.

A relay associated with the electro-valve 16a comprises a coil 36a connected between earth and the winding of the electro-valve. This coil actuates a circuit-breaker 37a which is normally open and is mounted on a conductor 38a connecting the conductors 23a and 34a. Finally, a return loop 40a connects the front motor to a point 39a of conductor 23a. Connected in the said loop is a valve such as a diode 41a which permits the flow of current only in the direction from the motor towards the contact 20a through the point 39a.

Rearwardly, there is an identical arrangement for the left-hand rear wheel. The position of the chassis relatively to the left-hand rear half-axle is revealed by a level-detector comprising a movable contact 20 connected by a conductor 23 to the second output terminal 25 of the impulse contact, a fixed contact 21 connected to the winding of the electro-valve 16 associated with the left-hand rear suspension element, and a fixed contact 22 connected to the coil 32 which actuates a circuit-breaker 33 connected in the conductor 34 connecting the rear motor 14 to the point 35.

A relay associated with the rear left-hand electro-valve 16 comprises a coil 36 mounted between earth and the winding of the electrovalve. The said coil actuates the circuit-breaker 37 connected on the conductor 38 connecting the conductors 23 and 34. A return loop 40 connects the motor 14 to a point 39 on the conductor 23 and connected in this loop is a valve such as a diode 41 which permits the passage of current only in the direction from the motor to the point 39.

For the right-hand rear half-axle, there is also a level-detector which comprises a movable contact 20' and a single fixed contact 21' corresponding to an excessively low position of the chassis relatively to the axle. The fixed contact 21' is connected to the winding of the electro-valve 16' associated with the suspension element of the right-hand rear wheel, whereas the movable contact 20' is connected to the fixed contact 21 of the level detector associated with the left-hand rear wheel.

In order to simplify the description of the functioning of the arrangement, consideration will first be given solely to the front axle of the vehicle, the suspension elements of which are assumed to be intercommunicating.

With the circuit breaker 30 closed, the putting into action of the impulse contact 26, for supplying an impulse to the conductors 23 or 23a may be effected in any appropriate manner. Nevertheless, it is preferable to control the manipulation of this contact by means of the acceleration pedal at the start of its travel, the re-engagement being effected by the return of the same pedal at the end of travel. This arrangement permits a correction to be made of the vehicle trim with each acceleration, after having released the accelerator.

If the position of the vehicle is too low, contact is established between 20a and 21a. When an impulse is provided by 26, the current passes through the conductor 23a, the contacts 20a and 21a, and energizes the winding of the electro-valve 16a. Simultaneously, this current energizes the coil 36a of the relay associated with the electro-valve. The circuit breaker 37a of this relay is closed, in such manner that the current coming from the battery 29 is able to flow through the conductors 34a and 38a so as to continue to energize the winding of the electro-valve. This takes place as long as the contacts 20a and 21a are in contact with each other and even after the passage of the impulse. So, the energization of the electro-valve has the effect of admitting fluid into the suspension elements, and this raises the vehicle. When the chassis reaches a pre-determined level, the contacts 20a and 21a open and the winding of the electro-valve is no longer energized. It should be noted that during this phase the current is not able to reach the motor, in view of the fact on the one hand that the circuit-breaker 33a is normally open and on the other hand that the valve 41a prevents the current from reaching as far as the motor.

If the level of the vehicle is too high, contact is established between 20a and 22a and an impulse supplied through 23a, 20a, 22a will energize the coil 32a of the relay associated with the motor. The circuit-breaker 33a is thus closed, in such manner that the current reaches the motor directly through the conductors 34a, and the electric motor is started. Re-feeding of the motor is effected through the loop 40a, 23a, 20a, 22a, which continues to energize the coil 32a, so as to keep the circuit-breaker closed, as long as contact is maintained between 22a and 20a, even if the impulse is terminated. The starting-up of the motor driving the compressor results in the withdrawal of fluid from the suspension elements and consequently in the lowering of the vehicle. When the chassis reaches a pre-determined level, the contacts 20a and 22a are separated and the relay coil is no longer energized, with the result that the circuit-breaker 33a is opened and the motor stops.

Of course, when the chassis is at a median level, no contact is established by the level contact and no current flows when an impulse is supplied by the contact 26. In fact, the circuit-breakers for the relays 33a and 37a are normally open and the diode 41a prevents the impulse from energizing the front electric motor.

At the rear of the vehicle, the electric motor 14 exerts a common action on the two rear suspension elements, whereas the electro-valves 16 and 16' act separately. The operation of the device associated with rear left-hand suspension element is identical with that which has just been described with regard to the front suspension as a whole. On the other hand, the operation of the electro-valve 16' depends on the functioning of the electro-valve 16 associated with the rear left-hand wheel, which is thus the pilot wheel for the rear wheel set of the vehicle.

Thus, when the chassis is too high relatively to the rear left-hand half-axle 2, the contacts 20 and 22 are in contact with each other and if a pulse is supplied through the contact 26, the motor 24 operates, driving the compressor which withdraws fluid from the two suspension elements simultaneously. Furthermore, if the chassis is too high relatively to the rear right-hand half-axle, the contacts 20' and 21' will close the circuit leading to the winding of the electro-valve 16'. However, the impulse and the current will not be able to reach as far as this electro-valve unless the contact is established between 20 and 21, i.e. if the rear left-hand half-axle is too near to the chassis. In this case, the circuit-breaker 37 of the relay providing for the supply of current to the winding of the electro-valve 16 will also provide for the supply of current to the winding of the electro-valve 16' through 35, 34, 37, 38, 20, 21, 20' and 21'.

To sum up, the circuit of the electro-valve 16' functions independently from the instant at which the relay associated with the electro-valve 16 is energized. It is however, unable either to interrupt it or to maintain it.

It is self-evident that the embodiment described may be modified in numerous ways without thereby exceeding the scope of the invention. Thus, for example, it would be possible to modify the direction of transfer of the fluid by the compressor and the electro-valves, or to provide other means equivalent to the diodes 41 and 41a.

What is claimed is:

1. In a trim-corrector device for a vehicle, comprising an electric motor driving a compressor and an electro-valve associated with at least one suspension element for transferring compressible fluid between a chamber of variable volume of the suspension element and a chamber of fixed volume, in either direction, for regulating the level of the suspended masses relatively to the non-suspended masses, a device comprising a level-detector having contacts detecting the level of the suspended masses relatively to the non-suspended masses, a source of electrical energy connected by a connection to the said motor, a relay comprising a circiut-breaker connected in the said connection and a coil connected to a first contact of the said detector, a device capable of supplying an electric current and connected to a second contact of the said detector, a connection connecting a third contact of the said detector to the coil of the said electro-valve, a first means providing for the re-feeding of the said relay coil through the intermediary of the contact established between the first and the second contact of the said detector, and a second means providing for the re-feeding of the coil of the said electro-valve through the intermediary of the contact established between the second and the third contact of the said detector, in such manner that the motor for the electro-valve continues to be fed with current after the passage of the said impulse for as long as the contacts corresponding to the said motor or to the said electro-valve are closed by the said level detector.

2. A device as claimed in claim 1, wherein the first re-feeding means comprises a connection between the said motor and the said level-detector, a means being provided in the said connection for permitting the passage of current only in the direction from to motor to the detector.

3. A device as claimed in claim 2, wherein the means permitting the passage of the current in a single direction consists of a diode.

4. A device as claimed in claim 1, wherein the second re-feeding means comprises a relay comprising a coil connected across the terminals of the coil of the said electro-valve and a circuit-breaker connected between the connection connecting the source of energy to the electric motor on the one hand and the connection connecting the third contact of the said detector to the winding of the said electro-valve on the other hand.

5. A device as claimed in claim 1, for a trim-corrector, comprising a compressor for two suspension elements simultaneously, and a second electro-valve exerting an action which is separate from that of the first electro-valve, wherein the said second electro-valve is connected in such manner that it can be energized only for as long as the winding of the first electro-valve is energized.

6. A device as claimed in claim 1, wherein the device capable of supplying an electric impulse is a device the contacts of which are disengaged by the accelerator pedal of the vehicle at the start of its travel and re-engaged by the return of the same pedal at the end of travel.

References Cited in the file of this patent

UNITED STATES PATENTS

| | | |
|---|---|---|
| 2,887,324 | Jackson | May 19, 1959 |
| 2,987,312 | Allinquant | June 6, 1961 |
| 3,013,811 | Allinquant | Dec. 19, 1961 |
| 3,049,360 | Allinquant | Aug. 14, 1962 |